Aug. 23, 1960          W. R. WEAVER          2,949,816
                  TELESCOPE SIGHT FOR FIREARMS
Filed Jan. 16, 1956                          2 Sheets-Sheet 1
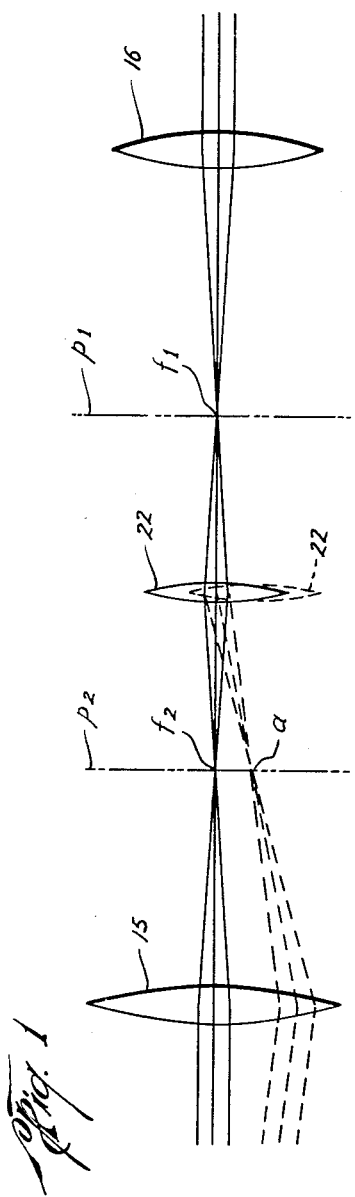
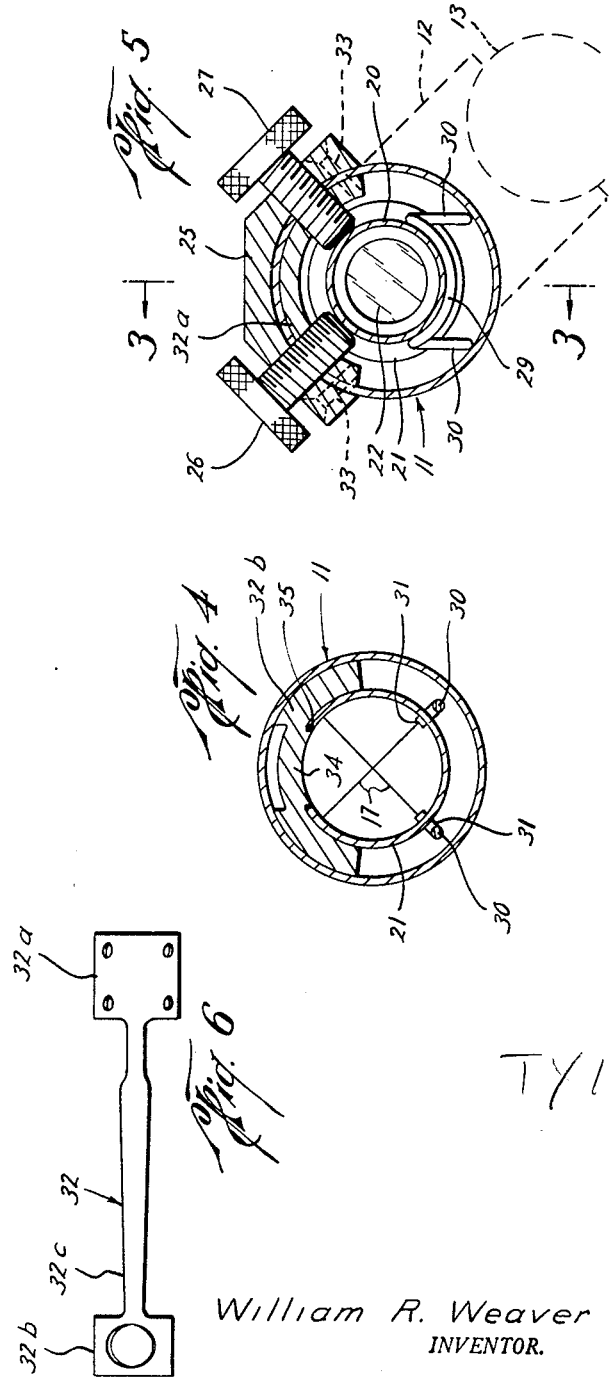
William R. Weaver
INVENTOR.
BY
ATTORNEY

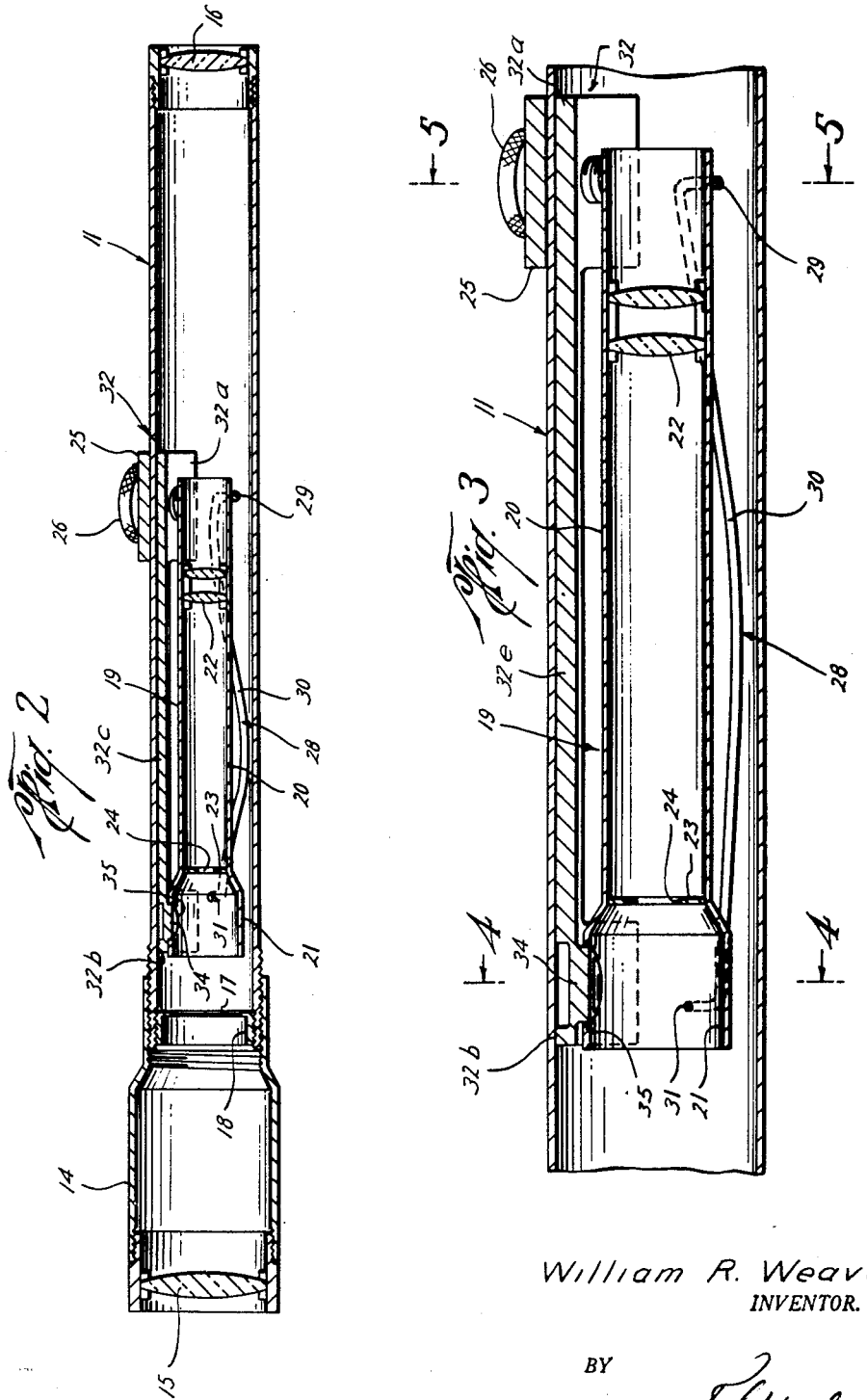

United States Patent Office 2,949,816
Patented Aug. 23, 1960

2,949,816

TELESCOPE SIGHT FOR FIREARMS

William R. Weaver, % W. R. Weaver Company, El Paso, Tex.

Filed Jan. 16, 1956, Ser. No. 559,284

5 Claims. (Cl. 88—32)

This invention relates to an improved sight for use on firearms.

In using telescope sights on firearms, adjustments of the scope are usually necessary to correct the scope for alignment errors in mounting on the firearms, to correct for bullet drop, to correct for individual variation in guns and ammunition, to adjust for various ranges and wind conditions so that the bullet will strike the point of aim.

In conventionally designed telescope sights these various adjustments are made by moving the sighting reticule transversely of the axis of the scope over the target image to center the reticule on the target. As a result of such adjustment the reticule may be removed far from the center of the field of view in the scope and this often proves annoying and disconcerting to the user.

Accordingly, it is a primary object of this invention to provide a scope construction wherein the reticule will remain centered in the field of view of the scope while the target image is caused to move relatively thereto in making sighting adjustments.

Another object is to provide a scope construction in which the sighting reticule is fixedly centered on the longitudinal axis of the scope and a movable lens system is employed to shift the target image relative to the reticule in adjusting the scope.

A further object is to provide a scope construction in which the sighting reticule is fixedly positioned intermediate the objective and ocular lenses, and transversely shiftable erector or image-inverting lens means is mounted in the scope between the reticule and objective lens, whereby shifting of the erector lens means transversely of the optical axis of the scope will correspondingly shift the target image relative to the reticule.

An additional object is to provide a scope construction employing a lens system including an objective lens, an ocular lens, and a transversely shiftable erector lens positioned between the objective and ocular lens, said scope having a fixed sighting reticule disposed between the erector lens and the ocular lens at the focus of the erector lens.

Still another object is the provision in a scope construction of the character described of a movable support means for the erector lens, said support means being adapted particularly to withstand recoil and other impactive forces without disturbing the pre-adjusted sighting position of the erector lens.

Other and more specific objects and advantages of this invention will become more readily apparent from the following detailed description when read in conjunction with the accompanying drawing which illustrates a useful embodiment in accordance with this invention.

In the drawing:

Fig. 1 is a diagrammatic view of the optical system of the sight to illustrate the shift in position of the image over the reticule by shifting of the inverter lens means;

Fig. 2 is a longitudinal sectional view through a sight constructed in accordance with one embodiment of this invention;

Fig. 3 is a fragmentary view in longitudinal section on an enlarged scale of a portion of the structure shown in Fig. 2, the section being taken generally along line 3—3 of Fig. 5;

Fig. 4 is a cross-sectional view along line 4—4 of Fig. 3;

Fig. 5 is a cross-sectional view along line 5—5 of Fig. 3; and

Fig. 6 is a top plan view of one of the pivoting elements for the erector lens support means.

A telescope sight in accordance with the present invention may be mounted on a firearm in any suitable manner whereby the sight barrel, designated generally by the numeral 11, will be held in substantially parallel relation to the barrel of the firearm. One sight mounting arrangement suitable for this purpose is illustrated in my U.S. Patent No. 2,632,251.

In the drawings, Figs. 2, 3, 4 and 5 illustrate the sight in a position turned 45° from the normal position in which the structure is normally mounted on a firearm barrel, as will be evident from the broken line outline (Fig. 5) of the receiver 12 and barrel 13 of a firearm.

Sight barrel 11 is provided at its lefthand end with an eye-piece 14 in which is mounted the ocular lens 15. Eye-piece 14 is threadedly secured to barrel 11 for longitudinal adjustment of the eye-piece for purposes of focusing ocular lens 15 in the usual manner. An objective lens 16 is mounted in the righthand end of barrel 11 in the usual manner. It will be understood that the ocular and objective lenses may be of any conventional form and construction generally used in telescopic firearm sights. For the purposes of this description, the righthand end of barrel 11 will be referred to as the forward end, and the lefthand end as the rearward end of the sight.

Mounted in the rearward end of sight barrel 11 adjacent the point of connection of eye-piece 14 is a reticule 17 of any conventional or well-known form, such as crosshair, post, or dot, a crosshair reticule being shown in the illustrative embodiment. Reticule 17 is mounted in any suitable support member, such as the sleeve 18, which is externally threaded to be screwed into the rearward end of barrel 11, which is internally threaded to receive sleeve 18, as shown.

Mounted inside sight barrel 11 substantially co-axial therewith and forwardly of reticule 17 is an inverter lens support tube, designated generally by the numeral 19, comprising an elongate substantially axially straight portion 20 merging into a radially enlarged rearward end portion 21.

An erector or image-inverting lens means 22 is mounted in the bore of portion 20 of the support tube near its forward end. Lens means 22 is of any suitable and generally conventional optical form and construction adapted to re-invert object images directed into the sight barrel from the objective lens in order that the images will appear in normal upright position to the eye of the user and relative to the reticule. It will be understood that lens means 22 may be of single or compound form, the illustrative embodiment illustrating diagrammatically a compound form of such a lens means. Between the erector lens means 22 and the rearward end of the support tube is a diaphragm member 23 having the central opening or aperture 24 by means of which random or divergent light rays are excluded from the eye-piece to concentrate the light passing through the erector lens, and thereby improve the sharpness of images viewed through the sight.

Mounted on the exterior of barrel 11, opposite the forward end of support tube 19, is an arcuate turret member 25 through which are threaded conventional elevation and windage adjustment screws 26 and 27, respectively, which, as best seen in Fig. 5, are mutually normal to each other, being positioned at an angle of 90° to each other, elevation adjustment screw 26 being centered vertically over barrel 11 and windage adjustment screw being disposed in horizontal position on the side of the sight barrel. Adjustment screws 26 and 27 are threaded through barrel 11 and bear against the exterior of support tube 19 near the forward end of portion 20, the screws engaging the exterior of the tube at 90° or normal to each other. A rocker-shaped thrust spring, designated generally by the numeral 28, is positioned between tube 19 and the inner wall of barrel 11 opposite turret member 25 to resiliently urge the support tube against the ends of adjustment screws 26 and 27, the spring being shaped so that its force will be directed generally along a line bisecting the angle between the adjustment screws. The purpose of rocker spring 28 is to continuously urge the support tube against the ends of the adjusting screws to obviate any backlash during adjustment of the erector lens means and to effect positive movement of the latter in response to movement of the adjusting screws. Another purpose of the rocker spring is to keep the pivot surfaces of bar member 32 (to be subsequently described) and support tube 19 in contact and engagement. Rocker spring 28 includes arcuate yoke 29 at its forward end which receives the forward end of tube portion 20. A pair of outwardly bowed arms 30—30 extend from the yoke longitudinally of the sight barrel and are outwardly curved at intermediate portions thereof to bear against the inner wall of barrel 11, the opposite ends of the arms terminating in upwardly and inwardly turned lugs 31—31, which project through suitable openings in the wall of portion 21 of the support tube adjacent its rearward end in order to anchor the rearward end of the spring to the support tube.

Longitudinally disposed between support tube 19 and the portion of the wall of barrel 11, generally diametrically opposite rocker spring 28, is an elongate relatively stiff metallic bar member, designated generally by the numeral 32, of generally arcuate cross section and comprising the relatively wider forward and rear end portions 32a and 32b, respectively, connected by a relatively narrow shank portion 32c (Fig. 6). Bar member 32 has its forward end portion 32a rigidly secured to the wall of barrel 11 opposite turret member 25 by any suitable means, such as the screws 33 (Fig. 5), which extend through turret member 25 and barrel 11 into threaded engagement with the forward end portion 32a of bar member 32. Rearward end portion 32b of bar member 31 is provided with a cylindrical pivot lug 34 which projects radially inwardly from the inner face of portion 32b and is rotatably journalled in an opening 35 provided in the wall of portion 21 of the support tube 19 adjacent its rearward end.

By means of the pivoted connection between rearward end portion 32b of bar member 32 and the erector lens support tube, it will be seen that when the forward end of the support tube is moved by either of the adjustment screws 26 or 27, the pivoted connection between the rearward end of bar member 32 and the rearward end of support tube 19 will cause the latter to pivot about lug 34 sufficiently to accommodate the adjustment provided by the movement of the screws. Rocker thrust spring 28 will continuously urge the support tube toward the ends of the adjustment screws during this movement in order to render the movement positive throughout its extent.

By making bar member 32 of relatively stiff construction, a strong assembly results which will maintain the erector lens support tube in the adjusted position by resisting the strong forces resulting from recoil of the firearm or rough handling thereof, and will thereby maintain the erector lens in its adjusted sighted-in position, despite repeated firing of the firearm.

From the foregoing description, it will be seen that reticule 17 will be fixedly positioned at all times in the sight barrel and will ordinarily be centered on the optical axis of the sight. By this arrangement, the reticule will always appear centered in the field of view of the observer. By means of the pivoted erector lens means, above described, the operator will be enabled to move the image of the sighting object relative to the reticule in making adjustments of the sight required to sight-in the scope on the target, so that the target image may be substantially centered on the reticule at all times.

The diagrammatic illustration appearing in Fig. 1 illustrates the manner in which the target image may be shifted relative to the reticule. The first image in inverted form will appear in the plane $p_1$, which is located at focus $f_1$ of the objective lens 16. This image is transmitted through erector lens 22 by which it is re-inverted to the upright position, the image appearing in the plane $p_2$ which is located at the focus $f_2$, so that the re-inverted image will appear in focus on the reticule. An off-center position of the erector is shown in broken lines on Fig. 1, and it will be readily seen that by shifting the erector lens from the broken line position to the full line position, the image will move from point A, initially displaced from the optical axis, to a position on the optical axis at $f_2$. The magnitude of the adjustment normally required will be quite small and the movement of the image over the reticule can be effected by very small movements of the erector lens.

It will be understood that various modifications and alterations may be made in the details of the illustrative embodiment within the scope of the appended claims but without departing from the spirit of this invention.

What I claim and desire to secure by Letters Patent is:

1. In a telescope sight for firearms comprising in combination with a sight barrel carrying longitudinally spaced objective and ocular optical elements and an image-inverting optical element disposed between said objective and ocular elements, a pivoted support structure for the image-inverting element comprising a tubular member disposed generally longitudinally in the barrel, and means for pivotally connecting said tubular member to said barrel, said means comprising an elongate bar member disposed longitudinally between the barrel and said tubular member, said bar member having its forward end rigidly secured to the barrel, and having a curved section at its rearward end in partial engagement about the rearward end portion of said tubular member, a cylindrical pivot pin projecting radially from the inner face of said curved section intermediate the ends of the curved section and receivable in a complementary socket in said rearward end portion of the tubular member, and means resiliently urging said tubular member radially toward said bar member.

2. A telescope sight for firearms, comprising in combination with a sight barrel and longitudinally spaced objective and ocular elements mounted in the barrel, a sighting reticule fixedly positioned in the barrel between the objective and ocular elements and at the second image plane, a tubular member extending longitudinally within said barrel between said reticule and said objective element with the rearward end of said tubular member positioned adjacent said reticule, a support mounting said tubular member for pivotal movement about its rearward end, an image-inverting optical system positioned in said tubular member between the reticule and the objective element, and means for shifting said tubular member angularly about its rearward end to thereby shift a sighted image relative to the reticule while maintaining the optical axis of the image-inverting optical system in close proximity to the center of the reticule.

3. A telescope sight according to claim 2 having a centrally-apertured light-concentrating diaphragm member coaxially mounted in said tubular member rearwardly of said image-inverting system.

4. A telescope sight according to claim 2 wherein said means for shifting said tubular member comprise mutually normal adjustment means engageable with the forward portion of said tubular member.

5. A telescope sight for firearms, comprising in combination with a sight barrel and longitudinally spaced objective and ocular elements mounted in the barrel, a sighting reticule fixedly positioned in the barrel between the objective and ocular elements and at the second image plane, a tubular member extending longitudinally within said barrel between said reticule and said objective element with the rearward end of said tubular member positioned adjacent said reticule, a support mounting said tubular member for pivotal movement about its rearward end, an image-inverting optical system positioned in said tubular member between the reticule and the objective element, and means for shifting said tubular member angularly about its rearward end to thereby shift a sighted image relative to the reticule while maintaining the optical axis of the image-inverting optical system in close proximity to the center of the reticule, said support comprising an elongate bar member disposed longitudinally between the barrel and said tubular member, said bar member having its forward end rigidly secured to the barrel, and having a curved section at its rearward end in partial engagement about said rearward end of the tubular member, a cylindrical pivot pin projecting radially from the inner face of said curved section intermediate the ends of the curved section and receivable in a complementary socket in said rearward end of the tubular member, and means resiliently urging said tubular member radially toward said bar member.

References Cited in the file of this patent

UNITED STATES PATENTS

| | | |
|---|---|---|
| 1,628,776 | Henderson | May 17, 1927 |
| 2,496,045 | Ford | Jan. 31, 1950 |
| 2,578,130 | Ford | Dec. 11, 1951 |
| 2,580,280 | Bullard | Dec. 25, 1951 |
| 2,784,641 | Keuffel et al. | Mar. 12, 1957 |
| 2,858,732 | Kollmorgen et al. | Nov. 4, 1958 |

FOREIGN PATENTS

| | | |
|---|---|---|
| 428,618 | Germany | May 10, 1926 |